(12) United States Patent
Beecher

(10) Patent No.: US 7,649,875 B2
(45) Date of Patent: Jan. 19, 2010

(54) NETWORKING LAYER EXTENSION

(76) Inventor: Phillip E. Beecher, 16 Saxon Road, Hove (GB) BN3 4LE ( * ) Notice: Subject to any disclaimer, the term of this patent is extended or adjusted under 35 U.S.C. 154(b) by 461 days.

(21) Appl. No.: 11/635,200

(22) Filed: Dec. 7, 2006

(65) Prior Publication Data

US 2007/0147428 A1 Jun. 28, 2007

Related U.S. Application Data

(60) Provisional application No. 60/753,984, filed on Dec. 23, 2005.

(51) Int. Cl.
*H04Q 7/24* (2006.01)
*H04J 3/16* (2006.01)

(52) U.S. Cl. ........................ 370/338; 370/469

(58) Field of Classification Search .............. None
See application file for complete search history.

(56) References Cited

U.S. PATENT DOCUMENTS

| 7,236,470 | B1 * | 6/2007 | Bims ........................... 370/328 |
| 7,302,700 | B2 * | 11/2007 | Mao et al. ..................... 726/11 |
| 2004/0185899 | A1 * | 9/2004 | Hayem et al. ............. 455/552.1 |
| 2006/0083254 | A1 * | 4/2006 | Ge et al. ..................... 370/401 |
| 2007/0097993 | A1 * | 5/2007 | Bojahra et al. .............. 370/401 |
| 2007/0184864 | A1 * | 8/2007 | Leitch et al. ................ 455/507 |

\* cited by examiner

*Primary Examiner*—Hong Cho
*Assistant Examiner*—Eunsook Choi
(74) *Attorney, Agent, or Firm*—O'Keefe, Egan, Peterman & Enders LLP

(57) ABSTRACT

A device, for example a ZigBee device, includes an 802.15.4 MAC layer 4 and a ZigBee networking layer 2. A switch layer 10 is provided, having an interface 12 imitating a MAC layer interface and a database 18. The switch layer 10 is able to parse commands from the ZigBee networking layer 2 and route them if appropriate to an alternative lower layer 14.

14 Claims, 2 Drawing Sheets

NETWORKING LAYER EXTENSION

CROSS-REFERENCE TO RELATED APPLICATIONS

This application claims priority to Provisional Patent Application No. 60/753,984 filed Dec. 23, 2005.

FIELD OF INVENTION

The invention relates to a device including a networking layer and a lower layer, a method of operating the device, a network including the device, a method of operating the network, and computer code for implementing the methods.

RELATED ART

ZigBee is a wireless networking standard that typically operates in the 2.4 GHz ISM radio band, the same radio band as Bluetooth. ZigBee operates using the 802.15.4 standard for low power control and monitoring circuits. Although it is slower than Bluetooth, it can operate on considerably less power.

ZigBee supports hierarchical, tree and table driven routing.

The 802.15.4 standard provides a Medium Access Control (MAC) layer as well as a physical (PHY) layer that is used for ZigBee networking.

As illustrated schematically in FIG. 1, the ZigBee layer 2 sits on top of the 802.15.4 standard. The ZigBee layer communicates with the MAC layer 4 through a ZigBee interface 8 in the MAC layer. The MAC layer also includes a physical layer interface 10 which interfaces with the physical layer 6.

BRIEF DESCRIPTION OF THE DRAWINGS

For a better understanding of the invention, embodiments will now be described, purely by way of example, with reference to the accompanying drawings, in which.

DETAILED DESCRIPTION

A problem that may occur with such networking is that certain routes within the network may become busy. A further problem is that parts of the network may become separated by more than the distance of reliable wireless communication, but it would still be desirable to have a single logical network.

The problem may also occur with other networking layers interfacing with an 802.15.4 MAC layer.

There may also be a need to connect devices into a ZigBee network which are not linked using an 802.15.4 standard link.

The invention provides a method of operating a switch layer for serving a networking layer with communications links to a plurality of destinations linked by a plurality of lower layers including an 802.15.4 MAC layer and at least one alternate interface layer.

When processing a command received from the networking layer requiring transmission of a message to a specific destination, the switch layer checks a database to determine whether the database contains information as to which physical layer connects to the specific destination and if so passes the command to the corresponding lower layer, and if the database does not contain information as to which lower layer connects the specific destination the switch layer passes the command to all lower layers.

In this way the alternate lower layers may be used to route to destinations that cannot be linked by the normal 802.15.4 route, either because of congestion, or because the destination is at too great a distance to allow the low powered wireless networking of 802.15.4 to operate.

The method also allows devices such as printers on other wired or wireless networked to be logically considered by the networking layer to be simply part of the same network.

This functionality is provided without requiring any change in the networking layer.

Accordingly, in a preferred embodiment a standard ZigBee networking layer can be used without change.

In other aspects, the invention relates to a network implementing the method, and to a network device implementing the method.

Figure 1:
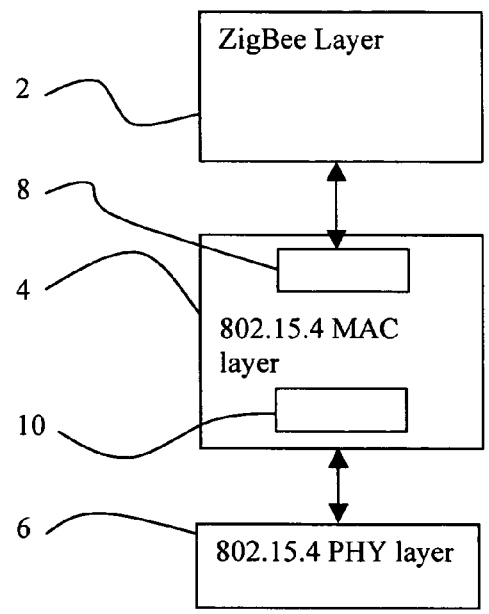
FIG. 1 illustrates a prior art ZigBee networking system.
Figure 2:
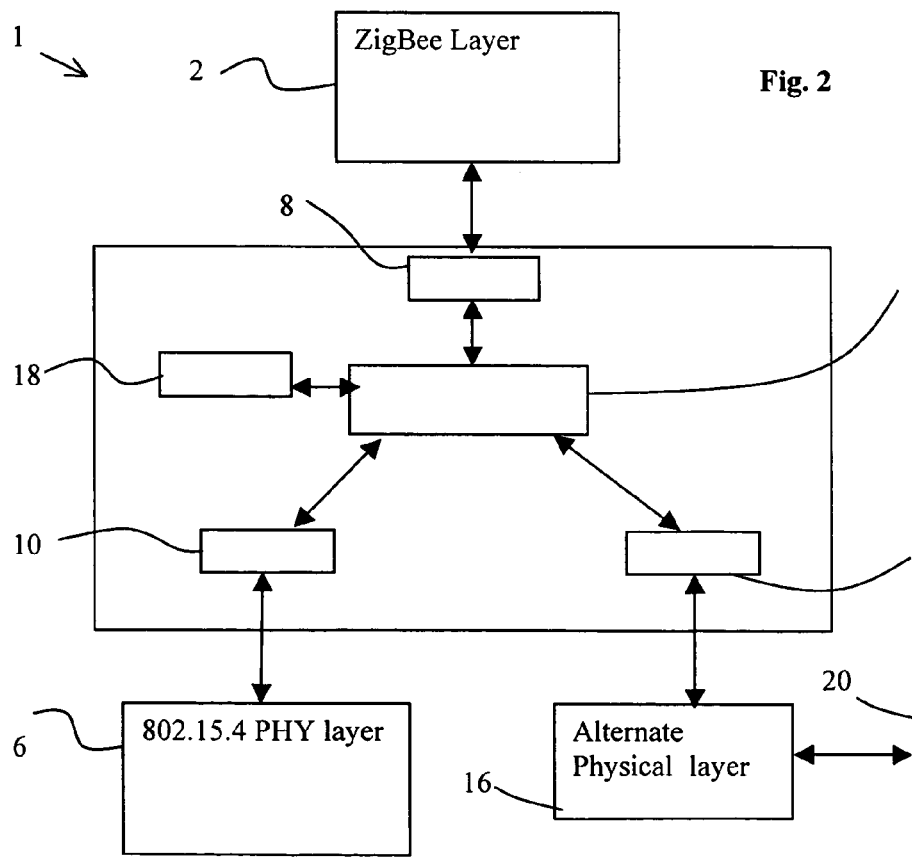
FIG. 2 illustrates a system according to a first embodiment of the invention.

Referring to FIG. 2, the software stack in a ZigBee enabled device 1 is modified to include an extra layer, which will be referred to as the switch layer 12, which is inserted in the MAC layer 4 between the Zigbee interface 8 and the physical layer interface 10.

In the described embodiment the networking and MAC layers 2, 4, are implented as computer program code that is arranged to cause the device 1 to carry out the methods as described below.

The switch layer 12 is in communication with the 802.15.4 PHY lower layer 6 through physical layer interface 10. The switch layer 12 is also in communication with an alternate lower layer, in the example physical layer 16, through alternate interface layer 14. Data about the location of devices in the form of the lower layer through which the device can be reached is stored in database 18 as will be described below. The database 18 may simply store date in the form of a record linking an address, a pointer (in general a handle) to the interface through which the address can be reached, and optionally a time stamp.

In use, as far as the networking layer 2 is concerned, the networking layer 2 simply communicates with a relatively standard MAC layer of an 802.15.4 MAC layer, through interface 8. This allows the invention to be used with existing or conventional networking layers 2 without requiring them to be rewritten.

The networking layer 2 can request a number of different classes of operation, including:

(1) Transmitting a message to a single destination, optionally on a predetermined channel;

(2) Listening on a pre-determined channel for a message; and (3) Managing the MAC layer.

The switch interface 12 provides all these functionalities.

In the case that the network layer 2 wishes to transmit a message to a single destination, the switch layer 12 parses the request for transmission to determine the address of the destination and determines which transmission medium the message should be directed to. If the destination is known to be in communication through the 802.15.4 physical layer 6, then the switch layer simply passes on the message unchanged to the physical layer interface 10. If the device is known to be in communication through an alternate physical layer 16, but not the 802.15.4 physical layer 6, the switch layer 12 directs the request for transmission to the alternate interface layer 14.

The information as to which lower layer the destination may be reached through may be obtained from the database 18 in communication with the switch layer 10.

In a preferred embodiment, after sending the message through one of the interfaces 10,14 the switch layer 12 waits for an acknowledgement message. In the event that no acknowledgement is received, the switch layer can attempt to resend the message. In the event that the switch layer is unable to transmit the message, the entry in the database 18 for that device, i.e. the address of the destination, may be deleted.

If on the other hand the switch layer does not have information about where the message is to be transmitted to, the switch layer 12 passes the message to both the interfaces 10,14 and hence to both lower layers 6,16. This will occur either in the case of a broadcast message or a message that needs to be sent to an address for which the database 18 does not contain an entry.

Again, in a preferred embodiment, the switch layer 12 waits for an acknowledgement message. The interface 10,14 through which the acknowledgement message is received is used to update the database 18. In the event that no acknowledgement is received, the switch layer can attempt to resend the message.

Another functionality that may be requested by network layer 2 is to require the lower layers to listen for a message. In this case, the switch layer 12 arranges for message reception to be enabled both on the interfaces 10,14 with both the 802.15.4 physical layer 6 and the alternate physical layer 16. The switch layer 12 passes messages received from both the 802.15.4 physical layer 6 and the alternate physical layer 16 back to the network layer 2, so that the network layer does not require any additional functionality to determine where the messages are coming from.

As the switch layer 12 passes on the messages, the switch layer stores information in the database 18 indicating which destination addresses communicate through the 802.15.4 layer 6 and which through the alternate layer 16. This information may then be used to route outgoing messages later.

In a preferred embodiment, a time stamp is used to identify the most recent time at which the address could be reached through the indicated interface. This time stamp can be updated each time there is a successful communication with the address. In some embodiments, the entries in the database expire after a predetermined time without successful communication, and may then be deleted.

The switch layer 12 takes incoming MAC management messages from the network layer and determines which interface is to operate them. The switch layer 10 parses the incoming messages and determines which interface 10,14 is to deal with them.

In the described embodiment, the device 20 which is in communication through alternate physical layer 16 is a ZigBee device that is capable of processing management messages, even though it is not linked through a normal 872.15.4 link. The management messages are passed through the alternate physical layer using tunneling, that is to say the complete message is packaged in a data format so that it can be transmitted through the alternate physical layer 16 to the device 20 where the message is unpacked and dealt with.

In an alternative embodiment, not shown, the device may not be a Zigbee device but a device using a different protocol. In this case, the alternate interface layer 14 includes a protocol converter for converting between protocols.

A number of options exist for the alternate physical layer 16.

One option is a wired point to point link such as the RS232/RS422 link where a single device is present at the far end of the link. This allows for an extension of the ZigBee network to include a device connected through a conventional network or even a device with no ZigBee functionality.

Another possibility for an alternate link is a wired multi-drop link such as RS 485 where multiple devices exist on a wired bus.

The alternate link may include a wired local area network using Ethernet or similar, in which again multiple devices may be connected.

A further possibility is to use a wireless local area network, for example using Bluetooth, 802.11, etc.

Figure 3:
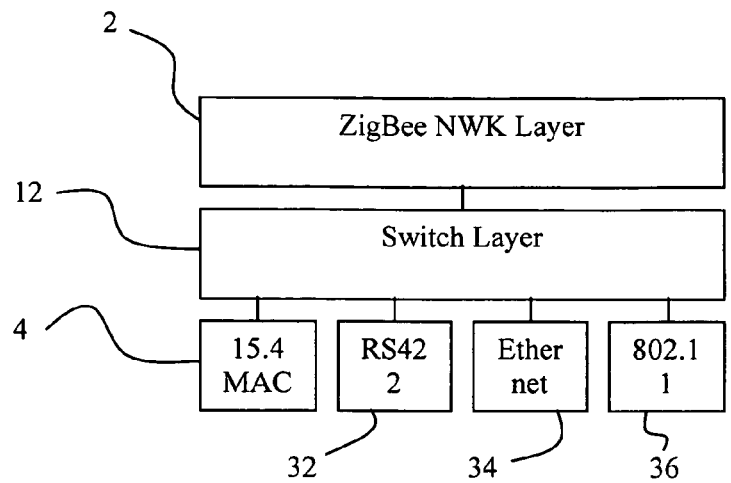
FIG. 3 illustrates a further embodiment of the invention.

As will be appreciated, multiple alternate networks may be used as illustrated schematically in FIG. 3.

In addition to the MAC layer 4 of the 802.15.4 network, in the embodiment of FIG. 3 the switch layer can also direct communications through an RS422 interface 32, an ethernet 34, and a Bluetooth interface 36.

In this case, messages to a destination address are routed to whichever of the lower layers the database 18 indicates as the lower layer through which the address can be reached, by passing the message to the corresponding interface layer 10,14.

Figure 4:
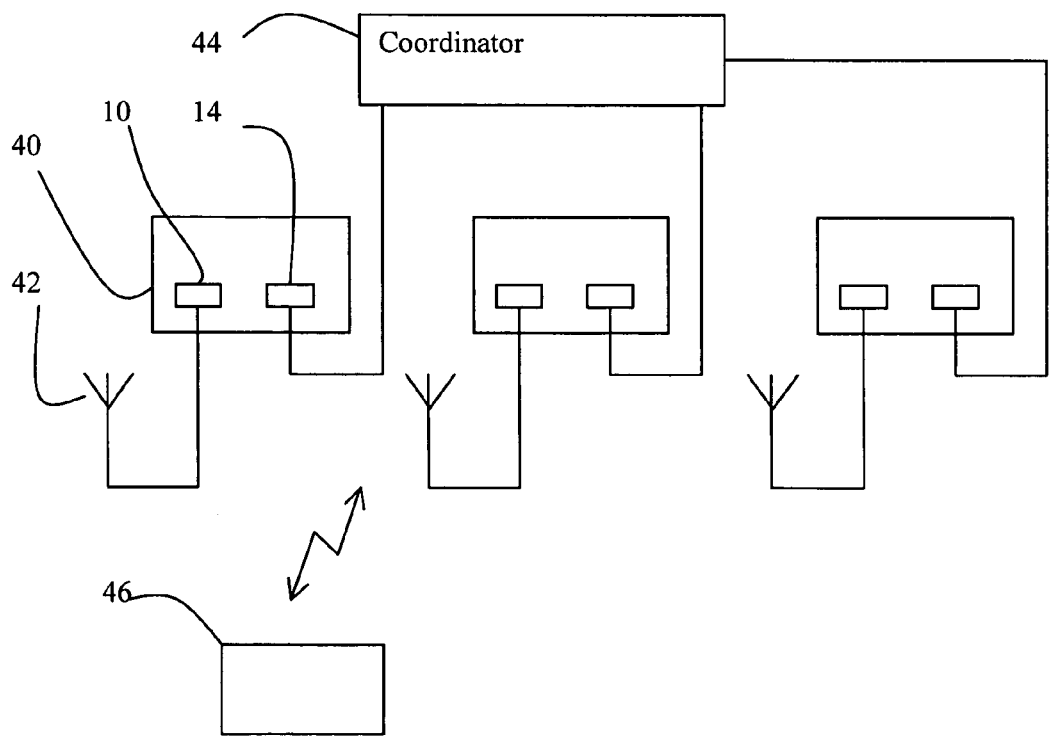
FIG. 4 illustrates an application of the embodiment of FIG. 2.

FIG. 4 shows an embodiment including a number of Zigbee networked devices 40 each with a wireless antenna 42, and a coordinator 44, which is also a Zigbee device, connected to the networked devices through wired links 46. The networked devices 40 implement the embodiment of the invention shown in FIG. 2, with the 802.15.4 physical layer 10 communicating with wireless antenna 42 and the alternate (wired) physical layer 14 communicating with coordinator 44. In this case, the database 18 contains fixed information so that messages to coordinator 44 are passed through physical layer 14.

Other Zigbee devices 46 are in connection with networked devices 40; these other Zigbee devices can be standard devices and the fact that the coordinator is not actually connected on the 802.15.4 link is hidden from these devices 46.

It will be noted that all of the above is achieved using an absolutely standard networking layer 2 and therefore the invention provides extended functionality without requiring any change in the ZigBee networking layer 2.

Also, although all the embodiments described above relate to a ZigBee layer, the invention is applicable to any networking layer that is used to control an 802.15.4 interface.

The embodiments above are not limiting and those skilled in the art will be able to implement the invention using other means. For example, in some embodiments there may be code in common between different interfaces 10, 14—this is of course particularly beneficial where there are more than two physical layers 6,16 and so more than two interfaces, though it also may give benefits with only an 802.15.4 interface and a single alternate.

The layers may be implemented in hardware or software as appropriate for any given application.

The invention claimed is:

1. A device including a multiplicity of logical layers, for networking to a plurality of destinations, comprising:
   a networking layer;
   a medium access control layer including a networking interface for interfacing with the networking layer; and an 802.15.4 interface for connecting to an 802.15.4 physical layer;
   wherein the medium access control layer further includes:
   at least one alternate interface for connecting to a respective alternate physical layer;
   a switch layer between the networking interface, the 802.15.4 interface and the at least one alternate interface capable of switching instructions and data received from and sent to the networking interface (i) through the 802.15.4 interface to the 802.15.4 physical layer (ii) through the alternate interface to the respective alternate physical layer, or (iii) through both the alternate interface and the 802.15.4 interface;

wherein the switch layer includes a database storing information about which physical layer connects to which destination; and the switch layer is arranged to process a message received from the networking layer requiring transmission of a message to a specific destination, by:

checking the database to determine whether the database contains information as to which interface connects to the specific destination and if the database contains the information as to which interface connects to the specific destination, by passing a command to the corresponding interface, and if the database does not contain information as to which interface connects the specific destination, by passing the command to both the alternative and 802.15.4 interfaces.

2. A device according to claim 1, wherein the switch layer is arranged, when passing a message received from a destination through one of the interfaces to the networking layer, to record in the database the address of the destination and a handle indicating which one of the interfaces was in communication with that destination.

3. A device according to claim 1, wherein the switch layer is arranged, when passing a message received from a destination through one of the interfaces to the networking layer, to record in the database the address of the destination, a handle indicating which one of the interfaces was in communication with that destination, and a time.

4. A device according to claim 1 wherein the device is a ZigBee device and the networking layer is a ZigBee networking layer.

5. A device according to claim 1 wherein at least one alternate interface is arranged to package 802.15.4 messages to the destination in a suitable message format for the corresponding physical layer so that they can be transmitted to the destination through the corresponding physical layer and unpackaged to be acted on as 802.15.4 messages at the destination.

6. A device according to claim 1 wherein at least one alternate interface is arranged to convert 802.15.4 messages to the destination to a suitable protocol for the corresponding physical layer.

7. A device according to claim 1 wherein the switch layer is arranged to process commands by:

if the command received from the networking layer requires listening for a message, the switch layer passes the command to both the alternative and 802.15.4 physical layers, and when the switch layer receives a message from a particular destination from a particular physical layer, the switch layer updates the database to indicate that the particular destination is connected through that physical layer.

8. A method of operating a switch layer of a device for serving a networking layer with communications links to a plurality of destinations linked by a plurality of physical layers including an 802.15.4 layer and at least one alternate layer through respective 802.15.4 and alternate interfaces, the switch layer including a database, the method comprising the steps of:

maintaining communication with a networking layer;

receiving messages from the networking layer through a medium access control layer including a networking interface for interfacing with the networking layer and an 802.15.4 interface for connecting to an 802.15.4 physical layer, the medium access control layer further including at least one alternate interface for connecting to a respective alternate physical layer;

parsing the messages and determining which destination should receive a command; and passing the command to the determined destination;

in a database; and wherein if the command requires transmission of the message to a specific destination, the switch layer checks the database to determine whether the database contains information as to which physical layer connects to the specific destination and if so passes the command to the corresponding physical layer, and if the database does not contain information as to which physical layer connects the specific destination the switch layer passes the command to both the alternative 802.15.4 physical layers.

9. A method according to claim 8 further comprising, when passing a message received from a destination through one of the interfaces to the networking layer, recording in the database the address of the destination and a handle indicating which one of the interfaces was in communication with that destination.

10. A method according to claim 8 further comprising, when passing a message received from a destination through one of the interfaces to the networking layer, recording in the database the address of the destination, a handle indicating which one of the interfaces was in communication with that destination, and a time.

11. A method according to claim 8 wherein the networking layer is a ZigBee networking layer.

12. A method according to claim 8 further including packaging in an alternate interface 802.15.4 messages to a destination in a suitable message format for the corresponding physical layer so that they can be transmitted to the destination through the corresponding physical layer and unpackaged to be acted on as 802.15.4 messages at the destination.

13. A method according to claim 8 wherein if the command received from the networking layer requires listening for a message, the switch layer passes the command to all layers, and when the switch layer receives a message from a particular destination from a particular layer, the switch layer updates the database to indicate that the particular destination is connected through that layer.

14. A network comprising:

at least one Zigbee device including a networking layer;

a medium access control layer including a networking interface for interfacing with the networking layer; and an 802.15.4 interface for connecting to an 802.15.4 physical layer;

wherein the medium access control layer further includes:

at least one alternate interface for connecting to a respective alternate physical layer;

a switch layer between the networking interface, the 802.15.4 interface and the at least one further lower interface capable of switching instructions and data received from and sent to the networking interface (i) through the 802.15.4 interface to the 802.15.4 physical layer (ii) through an alternate interface to the respective alternate physical layer, or (iii) through both the alternate interface and the 802.15.4 interface;

wherein the switch layer includes a database storing information about which physical layer connects to which destination; and the switch layer is arranged to process messages by:

if a message received from the networking layer requires transmission of a message to a specific destination, checking the database to determine whether the database contains information as to which interface connects to the specific destination and if so passes a command to the corresponding interface, and if the database does not contain information as to which interface connects the specific destination the switch layer passes the command to all interfaces;

the network further comprising at least one additional device connected through the alternate physical layer, the switching layer routing messages to and from the additional device so that each additional device appears to the network layer as a device on the ZigBee network.

* * * * *

UNITED STATES PATENT AND TRADEMARK OFFICE
CERTIFICATE OF CORRECTION

PATENT NO. : 7,649,875 B2  Page 1 of 1
APPLICATION NO. : 11/635200
DATED : January 19, 2010
INVENTOR(S) : Beecher It is certified that error appears in the above-identified patent and that said Letters Patent is hereby corrected as shown below:

In claim 8, column 6, line 9, delete "in a database, and wherein"

In claim 8, column 6, line 9, insert --wherein instructions and data received from and sent to the networking interface are switched (i) through the 802.15.4 interface to the 802.15.4 physical layer (ii) through the alternate interface to the respective alternate physical layer, or (iii) through both the alternate interface and the 802.15.4 interface; wherein information about which physical layer connects to which destination is stored in a database; and--

In claim 8, column 6, line 10, insert --wherein-- in front of "if the command requires transmission of the message to a"

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,649,875 B2 Page 1 of 1
APPLICATION NO. : 11/635200
DATED : January 19, 2010
INVENTOR(S) : Phillip E. Beecher It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 504 days.

Signed and Sealed this

Twenty-third Day of November, 2010

David J. Kappos
*Director of the United States Patent and Trademark Office*